United States Patent [19]

Sakai et al.

[11] Patent Number: 4,563,069

[45] Date of Patent: Jan. 7, 1986

[54] CONTROL SYSTEM FOR CARRYING OUT FOCUS DETECTION AND LIGHT MEASUREMENT OF A CAMERA

[75] Inventors: Shinji Sakai, Tokyo; Takashi Kawabata, Kanagawa, both of Japan

[73] Assignee: Canon Kabushiki Kaisha, Tokyo, Japan

[21] Appl. No.: 690,381

[22] Filed: Jan. 10, 1985

Related U.S. Application Data

[63] Continuation of Ser. No. 459,986, Jan. 21, 1983, abandoned.

[30] Foreign Application Priority Data

Feb. 3, 1982 [JP] Japan .................................. 57-14821

[51] Int. Cl.$^4$ ........................ G03B 3/00; G03B 7/093; G03B 7/08
[52] U.S. Cl. .................................. 354/402; 354/409; 354/458
[58] Field of Search ................................ 354/400–409, 354/410, 412, 456, 458–460, 484

[56] References Cited

U.S. PATENT DOCUMENTS

| | | | |
|---|---|---|---|
| 3,956,757 | 5/1976 | Nomura et al. | 354/51 |
| 4,297,012 | 10/1981 | Nakai | 354/50 |
| 4,408,854 | 10/1983 | Terui et al. | 354/25 |

Primary Examiner—William B. Perkey
Attorney, Agent, or Firm—Toren, McGeady, Stanger, Goldberg & Kiel

[57] ABSTRACT

Disclosed is a control system for carrying out the focus detection and the light measurement of a camera by means of which after the termination of the exposure the next focus detection and the next light measurement are controlled systematically so as to be started at a proper timing respectively in such a manner that the next focus detection and the next light measurement is prohibited before the diaphragm in the exposure state is brought back into the stationary state, in order to prevent the misoperation.

12 Claims, 5 Drawing Figures

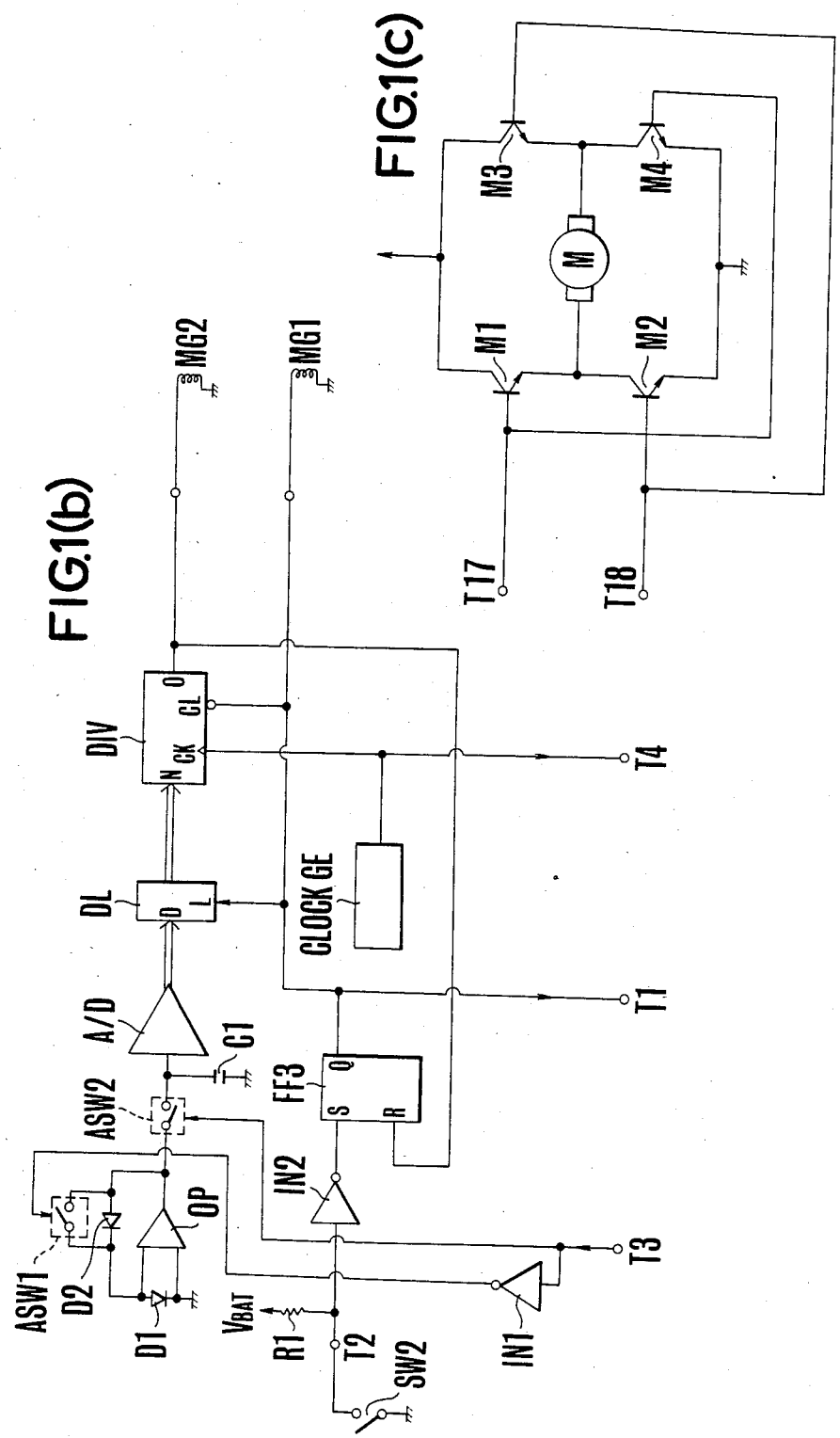

CONTROL SYSTEM FOR CARRYING OUT FOCUS DETECTION AND LIGHT MEASUREMENT OF A CAMERA

BACKGROUND OF THE INVENTION

Field of the Invention

This is a continuation of application Ser. No. 459,986, filed Jan. 21, 1983, now abandoned.

The present invention relates to a control system for carrying out the automatic exposure and the focus detection of a camera.

Description of the Prior Art

In case of the conventional automatic exposure control system of the single lens reflex camera, the light beam having passed the photographing lens and the quick return mirror is incident upon the photoelectric conversion element via the pentagonal prism and so on, whereby because the light measuring range is wide, even if the light measuring range is somewhat deviated due to the bounding of the mirror the influence upon the measured light value is little when the raised quick return mirror resumes the initial lower position, namely error of the measured value is small. Thus, the next light measurement after the termination of the exposure can be started comparatively early.

However, in case of the automatic focus control system in accordance to which the light beam coming from the object through the quick return mirror is secured by the photoelectric conversion element, the slight change of the view field or the length of the optical path due to the bounding of the mirror and so on often causes a large error on the result of the focus detection so that it is necessary to start the next focus detection after the lapse of a certain determined time after the termination of the exposure.

Namely, it is necessary to control the start of the next light measurement of the automatic exposure system and that of the next focus detection of the automatic focus detection at the proper timing. However, because as described above the start of the next light measurement and that of the next focus detection of the conventional device are controlled independently, it often takes a time to prepare for the next photographing or there is a possibility that no correct operation can not be obtained, which shortcoming is vital especially for the high speed continuous photographing with short photographing interval. Namely, the conventional device can substantially not be used for the high speed photographing.

SUMMARY OF THE INVENTION

It is, accordingly, an object of the present invention to systematically carry out the sequence of the automatic exposure control and the automatic focusing control.

Other features and purposes of the present invention will become apparent out of the explanation to be made below in detail with reference to the accompanying drawings.

BRIEF DESCRIPTION OF THE DRAWINGS

FIG. 1(b) shows a block diagram of an example of the automatic exposure control unit AEU in FIG. 1(a).

FIG. 1(c) shows a circuit for completing the driving unit FCU (U.S. Pat. No. 4,315,674) in FIG. 1(a).

DESCRIPTION OF THE PREFERRED EMBODIMENTS

Figure 1A:
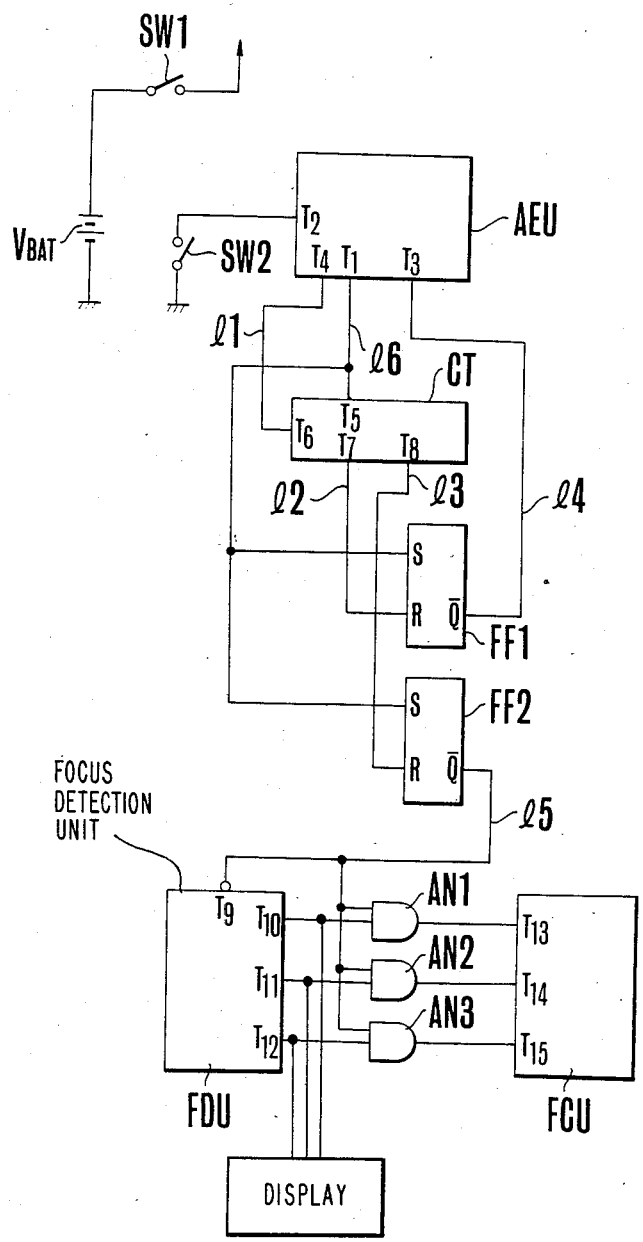
FIG. 1(a) shows an embodiment of the present invention.

Below, an embodiment of the present invention will be explained in detail in accordance with FIGS. 1 and 2. FIG. 1(a) shows a circuit of a camera for carrying out the in-focus detection and the light measurement. FIG. 1(b) shows the light measurement and the exposure control. In FIGS. 1(a) and (b), VBAT is the power source and SW1 the power source switch to be closed with the first stroke of the not shown release button, whereby when the SW1 is closed the power source VBAT is connected to the circuits to be explained later. AEU is the automatic exposure control unit for carrying out the automatic exposure, and the interval circuit is shown in FIG. 1(b). Below, the FIG. 1(b) will be explained. D1 is the photoelectric conversion elements for sensing the light from the object and D2 the logarithmic compression diode.

OP is the operational amplifier for converting the current produced in D1 into a voltage, ASW1 and ASW2 the analog switches to be operated in response to the input of the terminal T3, C1 the latch condenser, A/D the A-D converter, DL the digital latch and DIV the programmable divider having the digital input terminal N, the clock input terminal CK, the clear terminal CL and the output terminal O, whereby in accordance with the digital value of the input of the input terminal N, namely when the light measurement data is large the counted number is made small, while the light measurement data is small the counted number is made large and after the clocks are counted in such a manner a certain determined exposure is given to the film a high level signal is delivered from the output terminal O so as to supply current to the magent MG2 holding the tail shutter curtain. SW2 is the release switch corresponding to the second stroke of the release button. R1 is the pull up resistance, IN1 and IN2 the inverters, FF3 the RS flip-flop, clock Ge the clock generator and MG1 and MG2 the magnets for the leading shutter curtain and that for the tail shutter curtain of the focal plane shutter, whereby when they are supplied with current the respective shutter curtain is allowed to start to run.

The terminal T4 of the above-mentioned automatic exposure control unit AEU is connected to the terminal T6 of the counter CT (FIG. 1) via the line 11, whereby the count clock pulses are given from the terminal T4 to T6. The terminal T7 and T8 of the counter CT are Qm and Qn terminal (n≧m), when the number of the clock pulses given to the terminal T6 and counted by the counter reaches m and n the terminals T7 and T8 deliver a high level signal. The Qm and Qn terminals T7 and T8 of the counter CT are respectively connected to the reset terminal R the RS flip-flop FF1 and FF2 via the lines 12 and 13. The inverting output terminal $\bar{Q}$ of the RS type flip-flop FF1 is connected to the terminal T3 of the automatic exposure control unit AEU via the line 14, whereby by the high level signal from the terminal $\bar{Q}$ the light measurement starting time of the automatic exposure control unit AEU is determined. FDU is the in-focus detecting unit, which is a device equivalent to that comprising for example 12A in FIG. 3 of the U.S. patent and the photoelectric conversion elements 10, 11. This FDU is realized by providing analog switches between the photoelectric conversion elements 10, 11 and the input terminals of amplifiers 14, 15 in the above U.S. patent, whereby the clear terminal T9 is connected so as to drive the analog switches. The clear terminal T9 is connected to the inverting output terminal $\overline{Q}$ of the RS type flip-flop FF2 via the line 15 in such a manner that the in-focus detection is stopped or started by the signal from T9. The terminals T10–T12 of the in-focus detection unit FDU correspond for example to the input terminals of amplifier 14, 15 and the output terminal of the output ΔF of amplifier 24 of the device 12A disclosed in the above U.S. patent. From the terminals, the display signals for displaying the distance measurement result and the drive signal for driving the lenses are delivered. The terminals T10–T12 in FIG. 1 are respectively connected to the input terminals of the AND gates AN1–AN3, whose input terminals are connected so as to receive the signal of the line 15.

FCU is the driving unit for automatic focusing consisting of the driving circuit and so on for driving the display circuit for displaying the result of the in-focus detection or the lens. This driving unit is realized by connecting the device shown in FIG. 1(c) of the present invention to a device comprising the display control circuit 12B of the above U.S. patent, the display elements 47, 48 and 49 of the above U.S. patent and the resistors 50, 51 and 52 of the above U.S. patent, the terminal T17 of FIG. 1(c) between the display element 47 and the NAND gate 42 and the terminal T8 of FIG. 1(c) between the display element 49 and the NAND gate 44.

Hereby, in FIG. 1(c) M is a motor and M1–M4 the npn transistors, whereby the rotation direction of the motor depends upon the current direction.

The terminals T13–T15 of the driving unit FCU are connected to the output terminals of the AND gates AN1–AN3 so as to be supplied with the in-focus signals from the in-focus detection unit.

Below, the operation of the above constructed circuit will be explained. When the power switch SW1 is closed with the first stroke of the release button, the power source VBAT is connected to the circuit. Thus, the circuit starts to operate. At first the inverting output terminal $\overline{Q}$ of the flip-flop FF1 is on the high level, the analog switch ASW1 is opened and the output current of the photoelectric conversion element D1 is logarithmically compressed by the operational amplifier OP (FIG. 1(b)) and the diode D2 into a voltage. On the other hand, because the analog switch ASW2 is closed, the condenser C1 is changed with the output voltage of the operational amplifier OP. The voltage of the condenser C1 corresponding to the measured light value is connected by the A-D converter of the next step into a digital value. When then the release switch SW2 is closed with the second stroke of the release button, the high level of the input terminal of the inverter IN2 is changed to the low level so as to deliver a high level signal of the set input terminal S of the flip-flop FF3. The low level of the output Q of the flip-flop FF3 is inverted into the high level so as to supply current to the leading shutter curtain magnet MG1, whereby the leading shutter curtain starts to run. At the same time this signal is input the clear terminal T5 of the counter CI via the line 16 so as to clear the counter CT. On the other hand the signal is input into the input terminals S of the RS type flip-flop FF1 and FF2 via the line 16 so as to set the FF1 and FF2, the level of whose inverting output terminal $\overline{Q}$ becomes low. This signal is delivered to the terminal T3 of the automatic exposure control unit AEU via the line 14 in such a manner that during the film exposure the analog switch ASW2 is opened by the low level signal input in the analog switch ASW2. At the same time the low level signal input from the terminal T3 is inverted by the inverter so as to close the analog switch ASW1, short circuit the diode D2, clear the light value measured by the photoelectronic conversion element D1 and hold the measured light value by the condenser C1.

Further, this signal is delivered also to the clear terminal T9 of the in-focus detecting unit FUD and the input terminals of the AND gate AN1–AN3 via the line 15 so that during the film exposure the in-focus detecting unit is cleared and brought in the ready state for the next in-focus detection, while the AND gates AN1–AN3 are closed so that the level of their outputs becomes low and the signals are delivered to the terminals T13–T15 of the driving unit FCU so that the driving unit is prohibited to display the in-focus detection or to drive the lens.

When with the second stroke of the release button the level of the terminal T2 is inverted into the low level and the signal is delivered to the set input terminal S of the flip-flop FF3 via the inverter IN2 the low level of the flip-flop FF3 is inverted into the high level, when the output data of the A-D converter is latched in the digital latch, while at the same time the data is delivered to the divider DIV. According to the logarithmically compressed and A-D converted input data, namely measured light value of the photoelectronic conversion elements (hereby other exposure information are omitted for the sake of the simplification of the explanation) the divider DIV counts the clocks of the clock generator clock Ge so as to produce a high level signal when it has counted a certain determined number so as to supply current to the magnet MG2, whereby the tail shutter curtain starts to run, while at the same time a high level signal is delivered to the reset input terminal R of the flip-flop FF3, the high level of whose output terminal Q is inverted into the low level. Further, after the tail shutter curtain (not shown) has run the conventional reflecting mirror is lowered and further the conventional diaphragm (not shown) and so on resume the initial position. Hereby, for the sake of the simplification of the explanation of the present invention the explanation of the in-focus operation during the exposure cycle is omitted here.

The above signal is delivered to the clear terminal T5 of the counter CT and the set input terminals S of the RS type flip-flop FF1, FF2 via the line 16 so that counter CT counts the clock pulses given from the terminal T4 of the automatic exposure control unit AEU to the terminal T6 via the line 11. When the count number of the counter CT reaches m the level of the output of the Qm terminal T7 of the counter CT becomes high. This signal is delivered to the reset input terminal R of the RS type flip-flop FF1 via the line 12 so that the level of the inverting output terminal $\overline{Q}$ of FF1 becomes high. This signal is delivered to the terminal T3 of the automatic exposure control unit AEU via the line 14 so that as described above the analog switch ASW1, ASW2 operate so as to start the light measurement by AEU again. When the count number of the counter CT reaches n, the Qn terminal T8 has counted up so that the level of the output after that becomes high. This signal is delivered to the reset input terminal R of the RS type flip-flop FF2 via the line l3 so that the level of the inverting output terminal $\bar{Q}$ of FF2 becomes high. This signal is delivered to the clear terminal T9 of the in-focus detecting unit FDU and the input terminals of the AND gate AN1-AN3 so as to clear FDU, namely release the ready state and immediately start the in-focus detection again, while the AND gates AN-1-AN3 are opened so that the in-focus detection signal of FDU and the lens driving signal are delivered from the terminals T10-T12 to the terminals T13-T15 via the AND gates AN1-AN3 so that the driving unit FCU starts to display the in-focus detection and drive the lens. As described above, the light measurement is prohibited during a certain time t1 described by the timer CT after the exposure termination signal is delivered from the automatic exposure control unit AEU via the line l6, while the in-focus detection operation of the in-focus detection unit FDU is prohibited during the exposure and a certain determined time t2 (longer than t1) after the exposure time, whereby also the operation of the driving unit FCU is prohibited during the exposure and a certain determined time.

After the lapse of a certain time determined by the timer means CT after the exposure termination the focus detecting unit FDU, the driving unit FCU and the automatic exposure control unit AEU start to operate. Thus, the automatic exposure and the automatic exposure control free from the misdisplay or the misoperation is possible. Further, the next light measurement operation is carried out before the next focus detecting operation to be carried out after the lapse of a time t2 longer than the above determined time t2 after the termination of the exposure so that no waste time takes place during one cycle, which is fitted to the high speed continuous photographing. Although in case of the present embodiment the counter CT for counting the clocks is used as the timer, it goes without saying that the CR time constant of the one shot multivibrator and the like can be made use of, without counting the clocks.

Below, another embodiment of the means of the present invention for delivering the exposure signal to the line l6 will be explained in accordance with FIGS. 2 and 3.

Figure 2:
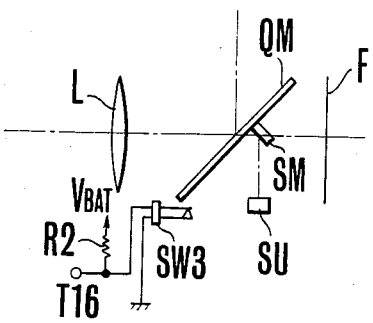
FIG. 2 shows the circuit diagram of the first embodiment of the exposure signal producing means to the line 16 in FIG. 1(a).

In FIG. 2, the exposure signal producing means is constituted by the switch for detecting the state of the quick return mirror of the single lens reflex camera.

In FIG. 2, L is the photographing lens and QM the quick return mirror whose central part constitute a half permeable mirror, whereby the submirror SM for detecting the light beam passing through the half permeable mirror is provided on the quick return mirror QM. SU is the sensor unit consisting of the optical system composed of a half permeable mirror for leading the light beam from the submirror to a row of the focus detecting photoelectronic converting elements arranged at the conjugate position with the focusing surface of the lens L (position of the film surface) and of a totally reflecting mirror and the above described row of the focus detecting photoelectronic converting elements. SW3 is the switch whose contact is in contact with the lower end of the quick return mirror QM so as to be closed when the quick return mirror is in the lower position. Thus, the switch SW3 is closed, and opened when the quick return mirror QM is raised, whereby the switch SW is opened. The one terminal of the switch SW3 is grounded, while the other terminal is connected to the terminal T16, whereby between the both terminals a pull up resistance R1 is connected. Because the quick return mirror QM is in the lower position all the time except for the exposure time the switch SW3 is closed, whereby the one end of the SW1 is grounded so that a low level signal is delivered from the terminal T16. During the photographing the quick return mirror is raised by not shown means, while at the same time the not shown shutter is opened so that during the exposure the switch SW3 is opened. Thus, a high level signal is produced at the terminal T16 by the pull up resistance R1.

When the signal produced at the terminal T16 is input in the line l6 in FIG. 1, the operation equivalent to that of the embodiment in FIG. 1 can be obtained. According to the present embodiment, when the focus detecting photoelectronic elements sense the light beam via the quick return mirror, the efficiency free from the following shortcomings of the exposure signal producing means in response to the current supply to the leading shutter curtain magnet and the tail shutter curtain magnet in FIG. 1 can be obtained.

The embodiment in FIG. 1 is the exposure signal producing means in response to the current supply to the leading shutter curtain magnet and the tail shutter curtain magnet so that it is necessary to set the time constant of the timer means, taking the time necessary for the quick return mirror to assume the completely stationary state after the tail shutter curtain has run. Thus, it is necessary to set the time constant of the timer means comparatively longer so that the time till the next focus detection and the next light measurement is wasted, which is inconvenient. Further, the quick return mirror is mechanically driven in most cases so that there is a possibility that the friction and the lubricant is varied during the time lapse. Thus, in case the exposure termination signal is obtained from the current supply to the tail shutter curtain magnet, the time till the stationary state of the above described quick return mirror is restored changes in such a manner that the next focus detection and the next light measurement could take place before the completely stationary state of the quick return mirror is restored. Namely, there is a possibility that misdisplay of the focus detection or misdriving of the lens could take place, which is inconvenient.

Figure 3:
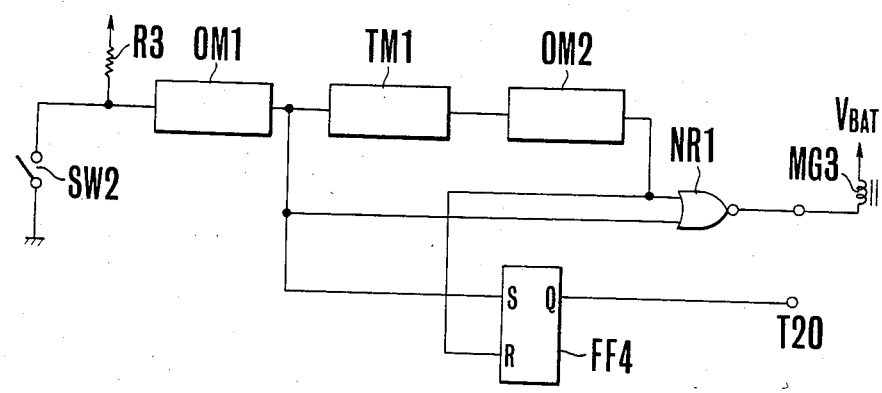
FIG. 3 shows the circuit diagram of the second embodiment of the exposure signal producing means.

FIG. 3 shows further another embodiment for producing the signal to the line l6 in FIG. 1 during the exposure in case the shutter is operated by a single magnet. In the drawing, SW2 is the release switch corresponding to the second stroke of the release button, whereby the one end is grounded, while the other end is connected to the one shot multivibrator OM1. Between the release switch SW2 and the one shot multivibrator OM1 the one end of the pull up resistance R3 is connected. The one shot multivibrator OM1 is connected to the shutter time timer TM, the NOR gate NR1 and the set terminal S of the RS type flip-flop FF4. OM2 is one shot multivibrator connected to the shutter time timer TM1 and the NOR gate NR1 so as to deliver the pulse to the NOR gate NR1 when the time of the shutter time timer TM1 is reached. Further, the output of the one shot multivibrator OM2 is connected to the reset input terminal R of the RS type flip-flop FF4. The output terminal Q of the flip-flop FF4 is connected to the terminal T17, while the output of the NOR gate NR1 is connected to the shutter control magnet MG3. With the second stroke of the release button the release switch SW2 is closed. Hereby, the signal whose level has been kept high with the pull up resistance R3 becomes low and input in the one shot multivibrator OM1. Thus, a high level pulse is delivered from OM1 to the NOR gate NR1, the level of whose output becomes low so that the current is supplied to the shutter control magnet MG3. As the result the shutter is opened so as to start the exposure. At the same time the high level signal is input in the set input terminal S of the RS type flip-flop FF4, the level of whose output terminal Q becomes high, while the level of the T17 connected to the output terminal Q becomes high. Further, the pulse of the one shot multivibrator OM1 is delivered also to the shutter time timer TM1 so as to operate the timer. When the time of the timer is reached, a pulse is delivered from the shutter time timer TM1 to the one shot multivibrator OM2, which delivers a pulse to the NOR gate NR1.

The level of the output of the NOR gate NR1 is low only during the pulse interval, whereby the shutter control magnet MG3 is again conductive so as to close the shutter and terminate the exposure. At the same time the pulse from the one shot multivibrator OM2 is delivered to the reset input terminal R of the RS type flip-flop FF4, when the level of the one shot multivibrator OM1 is low and the low level signal is given to the set input termianl S so that the level of the terminal Q is low and thus that of the terminal T17 is low. The output of the terminal T17 corresponds to the signal taking place in the line 16 in FIG. 1 during the exposure.

As the further another embodiment, a switch operatively engaged with the diaphragm of the photographing lens is provided so as to produce an exposure signal.

Further, the control sequence described with reference to FIG. 1 can be equally realized not only in a hard way but also in a soft way by means of programming in accordance with the present invention. Further, it goes without saying that by means of other methods it is possible to obtain the exposure termination signal described with reference to FIGS. 2 and 3 by mechanical or electrical timing so as to obtain a more correct timing. Thus, it goes without saying that as described above the counter CT in FIG. 1 can be replaced by or made use of as the counter or a circuit for example the one shot multivibrator making use of the CR time constant or a logic circuit.

In accordance with the present invention, by constituting the device as mentioned above the next light measurement of the automatic exposure is prohibited or the automatic focusing is latched at a correct timing with a simple counter or a simple timer during the exposure and so on.

In this way, the misoperation of the automatic exposure or the automatic focusing can be prohibited, the focus detecting unit cleared during the film exposure and the next sequence started at a correct timing, which enables the quick focus detection.

What we claim:

1. A control system for carrying out focus detection and light measuring of a camera comprising:
  (a) light measuring means for measuring the light passing the photographing lens of the camera;
  (b) focus signal producing means for detecting the light passing the photographing lens of the camera so as to produce a focus signal;
  (c) exposure-in-progress signal generating means for producing a signal representing that an exposure is being made;
  (d) first prohibiting means for prohibiting the operation of said light measuring means;
  (e) second prohibiting means for prohibiting the operation of the focus signal producing means; and
  (f) time means responsive to detection of the termination of the film exposure by the signal produced from said exposure-in-progress signal generating means for starting time count, said timer means having:
    (A) a first terminal for carrying an output signal of suitable duration for rendering said first prohibiting means operative to prohibit said light measuring means from being substantially driven; and
    (B) a second terminal for carrying an output signal of suitable duration for rendering said second prohibiting means operative to prohibit said focus signal-producing means from being substantially driven, said duration being longer than that of the signal produced at the first terminal.

2. A system according to claim 1, further comprising lens driving means for carrying out the focusing operation with the output of the focus signal producing means.

3. A system according to claim 1, further comprising display means for displaying the focussing state with the output of the focus signal producing means.

4. A system according to claim 1, further comprising automatic exposure control means for carrying out the exposure control with the output of the light measurement means.

5. A system according to claim 1, wherein exposure-in-progress signal generating means includes:
  (A) a quick return mirror for directing the light passing through a photographic objective of the aforesaid camera to said focus signal producing means;
  (B) switching means arranged to cooperate with said quick return mirror in such a manner that for assuming a first state when said quick return mirror is in a viewing position, and for assuming a second state when it is in a film exposing position a second; and
  (C) means for producing a signal when said switch means is in the second state.

6. A system according to claim 1, wherein the exposure-in-progress signal generating means includes:
  (A) a shutter release member;
  (B) detecting means responsive to actuation of said shutter release member for initiating an exposure; and
  (C) timer means arranged upon detection of the actuation of said shutter release member by said detecting means to start counting of a time depending on the output of said light measuring means with the generating of a film exposure-in-progress signal, and upon termination of duration of the counting time to stop the film exposure.

7. A system according to claim 6, wherein the exposure-in-progress signal producing means is a clock generator and a counter.

8. A system according to claim 6, wherein the exposure-in-progress signal producing means is a time constant circuit making use of the CR time constant.

9. A system according to claim 6, further comprising lens driving means for carrying out the focussing operation with the output of the distance measurement means.

10. A system according to claim 6, further comprising display means for displaying the focussing state with the output of the distance measurement means.

11. A system according to claim 6, further comprising automatic exposure control means for carrying out the exposure control with the output of the light measurement means.

12. A control system for carrying out the focus detection and the light measurement of a camera comprising:
(a) light measurement means, said means producing a signal necessary for the exposure control of the camera;
(b) focus detection means, said means producing a signal necessary for the focus detection of the camera; and
(c) exposure signal producing means, said means producing a certain determined signal during the exposure time;
(d) light measurement prohibiting means, said means prohibiting the light measurement during a certain determined time after the exposure termination, said exposure termination in response to the signal from the exposure signal producing means; and
(e) focus detection prohibiting means, said means prohibiting the focus detection during a certain determined time longer than the above determined time after the exposure termination, said exposure termination in response to the signal from the exposure signal producing means.

* * * * *